(12) United States Patent
Wagemann (10) Patent No.: US 12,428,080 B2
(45) Date of Patent: Sep. 30, 2025

(54) CRAWLER DRIVE FOR AN AGRICULTURAL WORK MACHINE AND AGRICULTURAL WORK MACHINE

(71) Applicant: CLAAS Industrietechnik GmbH, Paderborn (DE)

(72) Inventor: Sebastian Wagemann, Oelde-Sünninghausen (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 18/782,229

(22) Filed: Jul. 24, 2024

(65) Prior Publication Data

US 2025/0033717 A1     Jan. 30, 2025

(30) Foreign Application Priority Data

Jul. 24, 2023  (DE) .......................... 102023119484.4

(51) Int. Cl.
*B62D 55/112* (2006.01)
*A01D 69/00* (2006.01)
(Continued)

(52) U.S. Cl.
CPC ............ *B62D 55/112* (2013.01); *B62D 11/02* (2013.01); *B62D 55/10* (2013.01); *B62D 55/14* (2013.01); *A01D 69/00* (2013.01)

(58) Field of Classification Search
CPC ...... B62D 55/10; B62D 55/112; B62D 55/14; B62D 11/02; A01D 69/00
See application file for complete search history.

(56) References Cited

U.S. PATENT DOCUMENTS

| | | | |
|---|---|---|---|
| 5,316,381 A * | 5/1994 | Isaacson .............. | B62D 55/305 305/145 |
| 2005/0121207 A1* | 6/2005 | Juncker .................... | E02F 9/02 172/780 |

(Continued)

FOREIGN PATENT DOCUMENTS

| | | |
|---|---|---|
| DE | 102020105136 A1 | 9/2021 |
| EP | 3483048 A1 | 5/2019 |

OTHER PUBLICATIONS

European Search Report for EP Application No. 24177007.2-1009 mailed Nov. 5, 2024.

*Primary Examiner* — Christopher B Wehrly
(74) *Attorney, Agent, or Firm* — Lempia Summerfield Katz LLC (57) ABSTRACT

A crawler drive for an agricultural work machine, comprising front and rear main wheels, front and rear main frames associated with each respective main wheel, two support wheels, a running belt surrounding the two main wheels, and an articulation point through which the crawler drive is pivotably connected to a body of the agricultural work machine. The two main frames are coupled to one another to pivot about a common pivot axle, the support wheels are arranged on a common support frame, and the support frame is pivotably connected to the front main frame via a support wheel swing arm. The crawler drive further comprises a damping device with at least one piston-cylinder unit and hydraulically acting pressure device. The piston-cylinder unit is coupled at a swing arm end to the support wheel swing arm and at a frame end to the rear main frame.

17 Claims, 5 Drawing Sheets

(51) Int. Cl.
 *B62D 11/02* (2006.01)
 *B62D 55/10* (2006.01)
 *B62D 55/14* (2006.01)

(56) References Cited

U.S. PATENT DOCUMENTS

| | | |
|---|---|---|
| 2015/0266524 A1 | 9/2015 | Rackow |
| 2019/0135356 A1* | 5/2019 | Obermeier-Hartmann ................... B62D 55/30 |
| 2020/0269938 A1* | 8/2020 | Silies ..................... B62D 55/10 |
| 2021/0269106 A1 | 9/2021 | Weingärtner |
| 2024/0081182 A1 | 3/2024 | Bußmann |

* cited by examiner

CRAWLER DRIVE FOR AN AGRICULTURAL WORK MACHINE AND AGRICULTURAL WORK MACHINE

CROSS REFERENCE TO RELATED APPLICATION

This application claims priority under 35 U.S.C. § 119 to German Patent Application No. DE 10 2023 119 484.4 filed Jul. 24, 2023, the entire disclosure of which is hereby incorporated by reference herein.

TECHNICAL FIELD

The present invention relates to a crawler drive for an agricultural work machine and to an agricultural work machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A crawler drive may comprise a front main wheel and a rear main wheel. These main wheels may also be referred to in the art as so-called "idler wheels". Typically, one of the main wheels, such as the rear one, may be driven in rotation, while the other main wheel passively serves to guide a running belt that surrounds the main wheels. The running belt may also be part of the crawler drive. The main wheels are arranged opposite each other or one behind the other in the longitudinal direction of the crawler drive. In this context, the front main wheel is assigned to a front main frame, and the rear main wheel is assigned to a rear main frame. In particular, this assignment may consist of the main wheels being arranged directly or indirectly on their respective main frame, and each are rotatably mounted about an axis of rotation.

In particular, the front main wheel may be mounted on a swivel arm, which is arranged on the front main frame while forming its axis of rotation. The swivel arm is connected to the main frame and forms a swivel joint so that the swivel arm may swivel relative to the main frame. Since the axis of rotation of the main wheel is arranged at a distance from the swivel joint of the swivel arm on the main frame, a swiveling of the swivel arm relative to the front main frame is accompanied by a movement of the swivel axle of the front main wheel on a circular path around the swivel joint. This movement leads to a change in the distance between the axis of rotation of the front main wheel and the axis of rotation of the rear main wheel, whereby a belt tension of the running belt is changed. In such a configuration, the swivel arm may also interact with a piston-cylinder unit, through which a swivel movement of the swivel arm may be generated, and the belt tension of the running belt may accordingly be adjusted. Such a piston-cylinder unit may be referred to as a "belt tensioning cylinder". Such an indirect arrangement of the axis of rotation of the front main wheel on the front main frame may be understood as an arrangement of the front main wheel on the front main frame.

At least two support wheels are arranged in an intermediate area region located between the two main wheels. These may also be referred to in the art as so-called "midrollers". The support wheels typically have a smaller diameter than the main wheels. Like the main wheels, the support wheels are in direct contact with the running belt, wherein the support wheels are in contact with a lower section of the running belt, which typically comes into direct contact with the ground when the crawler drive is in operation. In this way, forces acting on the crawler drive may be dissipated into the ground via the two main wheels as well as via the two support wheels the running belt.

The crawler drive also comprises an articulation point through which it may be pivotably connected to a body of a respective work machine, while forming a machine axle. In a typical agricultural work machine, such as a combine harvester or a forage harvester, a crawler drive is arranged at opposite ends of a front axle of the respective work machine. The respective crawler drive is articulated to the front axle of the work machine at the aforementioned linkage point so that the work machine stands on a respective ground via the crawler drives, and an advancement of the work machine may be realized by the crawler drives.

The two main frames to which the main wheels are assigned are pivotably coupled together. This has the effect that the main frames may be pivoted against each other about a common pivot axle relative to each other. This pivot axle may be identical to the machine axle at the articulation point of the crawler drive. The pivot axle and the machine axle are each oriented horizontally and perpendicular to a running belt plane spanned by the running belt.

The support wheels are arranged on a common support frame, wherein they are arranged one behind the other in relation to a longitudinal axis of the crawler drive. Consequently, the main wheels and the support wheels are arranged "in line" when viewed in the longitudinal direction of the crawler drive, wherein the front main wheel forms a front end of the crawler drive, followed by the two support wheels and finally the rear main wheel forming the rear end of the crawler drive.

To connect the support frame to the main frame, a support wheel swing arm is provided through which the support frame is pivotably connected to the front main frame. The support wheel swing arm is articulated both to the front main frame and to the support frame. In mechanical terms, the support wheel swing arm is therefore designed as a pendulum rod. The articulated connection of the two main frames and the articulated connection of the support wheel swing arm to the front main frame help the main wheels and the support wheels to be separately liftable from each other when driving over an obstacle without the rest of the crawler drive unit lifting off the ground.

US Patent Application Publication No. 2015/0266524 A1, incorporated by reference herein in its entirety, discloses a crawler drive with the axle (referred to above as the pivot axle) about which the front main frame and the rear main frame are pivotably mounted relative to one another, and the machine axle, which is located at the articulation point of the crawler drive of a respective agricultural working machine, coincide.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

As discussed in the background, crawler drives may be used in agricultural vehicles. In order to cause a transfer of force which takes place via a crawler drive into a respective ground as more evenly (such as evenly as possible) via the individual wheels of the crawler drive (e.g., both main wheels and support wheels), a crawler drive typically comprises at least one piston-cylinder unit, which may be connected at a first end to the support wheel swing arm and at a second end to the front main frame. The crawler drive may comprise at least one additional piston-cylinder unit that connects the front main frame and the rear main frame to one another. The task of such piston-cylinder units may be basically to equalize the force distribution over the individual wheels, even when obstacles are driven over (e.g., the crawler drive is not completely resting on at least essentially flat ground). In other words, forces deflected via the crawler drive may be deflected as evenly as possible via the wheels into the ground.

It may be difficult to construct such crawler drives since the available installation space for the arrangement of various piston-cylinder units is limited. In addition, the coordination between the individual piston-cylinder units is involved in order to achieve the most uniform possible force transfer via the wheels of the crawler drive in different operating situations of the respective crawler drive, such as for different boundary conditions relating to the ground.

Thus, in one or some embodiments, a crawler drive for an agricultural work machine is disclosed that is constructed simpler than the prior art. In one or some embodiments, the crawler drive comprises a damping device that comprises at least one piston-cylinder unit and at least one hydraulically acting pressure device. The piston-cylinder unit may be single-acting or double-acting. In this regard, the crawler drive is configured to dampen movements that the support wheels and the rear main frame perform relative to one another. In one or some embodiments, a hydraulic pressure device may comprise a device through which at least one working chamber of a piston-cylinder unit may be subjected to hydraulic pressure. This may be done passively and/or actively (e.g., the pressure device may be formed by an active or a passive pressure device).

In one or some embodiments, a "passive pressure device" may be formed by a gas accumulator. Such a gas accumulator may generally comprise at least two pressure chambers (such as exactly two pressure chambers) fluidically separated by a diaphragm, wherein one pressure chamber is filled with pressurized gas (e.g., "gas chamber"), and the other pressure chamber (e.g., "fluid chamber") is in fluidic contact with a hydraulic fluid of a hydraulic system, wherein the hydraulic system includes at least one working chamber of a respective piston-cylinder unit. In this way, the hydraulic fluid may be displaced from the working chamber of the piston-cylinder unit and flow into the fluid chamber of the gas accumulator, and wherein the diaphragm may be deformed, and the gas that is in the gas chamber is may be compressed. As a result, the gas builds up increasing back pressure. Conversely, the gas may push the diaphragm (and also the hydraulic fluid in the fluid chamber) back into the working chamber of the piston-cylinder unit as soon as the volume of the latter (e.g., the fluid chamber) increases or a back pressure of a piston of the piston-cylinder unit drops and falls below the pressure prevailing in the gas chamber of the pressure device. In this case, the pressure device may effectively push back the piston of the piston-cylinder unit.

In one or some embodiments, these processes may be passive since the pressure device is not configured to actively exert a variable pressure on the hydraulic system, for example, via a pump. In one or some embodiments, the passive pressure device may be preloaded and therefore may exert a pressure on the hydraulic system. Alternatively, however, it may only react to changes introduced into the hydraulic system from outside.

In contrast, an "active pressure device" may comprise a device whose pressure in a hydraulic system may be actively changed. For this purpose, the pressure device may interact with a pressure source (e.g., a pump) or include such a source in an integrated manner. As one embodiment variant of an active pressure device, it is contemplated, for example, that a pressure source is assigned to the pressure device. Such a pressure source may provide hydraulic pressure, which may at least also act on the pressure device. The pressure device may be formed as such by a passive pressure device, for example, in the form of a gas accumulator. Consequently, in one or some embodiments, an aggregate comprising (or consisting of) a passive pressure device in conjunction with a pressure source may also be understood as an "active pressure device".

In one or some embodiments, the piston-cylinder unit is coupled at its first end ("swing arm end") to the support wheel swing arm and at its second end ("frame end") to the rear main frame. As a result, the rear main frame and the support wheel swing arm may be coupled to each other in a force-transmitting manner via the piston-cylinder unit. In one or some embodiments, the crawler drive may be free of further connections between the support wheel swing arm and the front or rear main frame, apart from the aforementioned piston-cylinder unit and the articulated linkage to the front main frame.

The crawler drive may have one or more advantages. In particular, a force distribution between the main wheels and the support wheels may be caused solely by the one piston-cylinder unit between the support wheel swing arm and the rear main frame. This is exemplified by the following case distinctions: first, the case is considered in which the front main wheel drives over an obstacle and is thereby raised relative to the support wheels and the rear main wheel. The lifting of the front main wheel is accompanied by the lifting of the front main frame, on which the support wheel swing arm is mounted. According to the above explanation, the piston-cylinder unit is articulated to the support wheel swing arm by its swing arm end. Accordingly, the piston-cylinder unit may also be raised slightly. In one or some embodiments, the amount of lifting in the front main wheel and the piston-cylinder unit may be in proportion to their respective distances relative to the pivot axle about which the front main frame is pivoted during the lifting of the front main wheel. Since the piston-cylinder unit is coupled to the rear main frame at its frame end opposite the swing arm end, the rear main frame may also be lifted slightly corresponding to the lifting of the piston-cylinder unit. Since the support wheel swing arm may be articulated to the support frame and the rear main frame may be articulated to the rear main wheel, the rear main wheel and the support wheels may remain at their previous height level and may therefore not be lifted off the ground. The piston-cylinder unit may ensure that the support wheels will continue to be used to transfer forces and therefore may contribute to the force transfer of the respective agricultural working machine into the ground.

In the second case considered here, the support wheels drive over an obstacle and are accordingly lifted. This may also be accompanied by a lifting of the support wheel swing arm to which the piston-cylinder unit is articulated. Since the support wheel swing arm may otherwise be connected to the front main frame by forming a joint, the front main frame may only be moved indirectly, for example, by lifting the rear main frame via the piston-cylinder unit and an associated lifting of the connection point at which the front main frame may be connected to the rear main frame while forming the joint axis. Since the front main wheel may be assigned to the front main frame while forming its axis of rotation, the pivoting of the front main frame may not be accompanied by a lifting of the front main wheel. As a result, the front main wheel may remain in contact with the ground via the running belt and may thereby divert forces acting on the crawler drive into the ground. The same may analogously apply to the rear main wheel.

The above-described principle may apply analogously when the rear main wheel is lifted as a result of driving over an obstacle, whereby the forces are transferred to the support wheels via the piston-cylinder unit.

Consequently, the crawler drive may have the advantage that, in the simplest implementation with only a single piston-cylinder unit, the crawler drive may ensure that forces are continuously and reliably transferred to the ground via the two main wheels and the two support wheels. As a result, the crawler drive may be designed simply, wherein a separate coupling member, which in the prior art is typically also designed as a piston-cylinder unit, may be dispensed with or removed.

In one or some embodiments, the at least one pressure device is designed to be integrated into the piston-cylinder unit. This may be particularly advantageous if the piston-cylinder unit is single-acting. This may further be particularly advantageous because it may save installation space, and the piston-cylinder unit may be made more compact overall.

Furthermore, it may be particularly advantageous if the damping device comprises at least two pressure devices, such as exactly two pressure devices, which interact with the same piston-cylinder unit. In this embodiment, the piston-cylinder unit may, for example, be double-acting, wherein the first pressure device may be operatively connected to a cylinder-side main working chamber of the piston-cylinder unit, and the second pressure device may be operatively connected to a piston side secondary working chamber of the piston-cylinder unit.

At least one of the pressure devices, such as both pressure devices, may be designed as a passive gas accumulator. This may allow the piston-cylinder unit as a whole to act particularly well as a gas spring and dampen shock loads that are transmitted by the piston-cylinder unit between the support wheel swing arm and the rear main frame. This may ensure better driving comfort for the respective work machine on which the crawler drive is arranged or positioned. In particular, sudden deflections caused by driving over obstacles and the resulting forces may be damped. In addition to improving driving comfort, this may also protect the components of the crawler drive and the respective agricultural working machine as a whole.

In one or some embodiments, if both pressure devices are designed to be passive, it may also be advantageous if the pressure devices are preloaded with different pressures. In this case, the first pressure device, which may operatively be connected to the main working chamber, may be preloaded with a greater pressure than the second pressure device, which may operatively be connected to the secondary working chamber. Various pressure ratios are contemplated. For example, the pressure ratio between the pressure devices may be at least 1.5:1, such as at least 2:1, irrespective of which pressure device is assigned to which of the working chambers. Nevertheless, in one or some embodiments, the more preloaded pressure device may be the one assigned to the main working chamber. Preloading the pressure devices with different pressures may have the advantage that they may contribute particularly well to damping in different force ranges. While with a comparatively low load on the crawler drive (e.g., in a combine harvester when driving on the road with an empty grain tank), one pressure device may be loaded with pressure from the piston-cylinder unit in as ideal a range of its characteristic curve as possible. The same may apply to the other pressure device for a comparatively high load on the crawler drive (e.g., when harvesting in the field with a full grain tank). The damping effect of the piston-cylinder unit may therefore be well distributed across different load ranges, and the damping device may provide a better overall damping effect over a wide load range.

Alternatively, in one or some embodiments, where both pressure devices interacting with the same piston-cylinder unit are formed by passive gas accumulators, it is also contemplated that at least one pressure device, such as both pressure devices, is or are actively designed (e.g., either comprises a hydraulic pressure source itself, or is connected to one, or interacts with one). In one or some embodiments, the respective active pressure device may also comprise a passive gas accumulator.

Via the hydraulic pressure source, a hydraulic pressure may be actively changed in the main working chamber and/or the secondary working chamber of the piston-cylinder unit during intended operation of the crawler drive in an agricultural machine. In one or some embodiments, an active pressure device may be assigned to the secondary working chamber on the piston side of the piston-cylinder unit.

The use of an active pressure device may have the advantage that the pressure in the respective assigned working chamber may be manipulated as required in order to influence the damping characteristics of the piston-cylinder unit. In particular, the piston-cylinder unit may be kept within a favorable range of its characteristic curve so that shocks are dampened very effectively. For example, it is contemplated that the piston-cylinder unit may be designed so that large forces are introduced into the ground via the crawler drive. This may be equivalent to meaning that the piston-cylinder unit transmits large forces between its swing arm end and its frame end. The design of the piston-cylinder unit for such a load case, which logically constitutes a large part of a typical utilization profile of the respective agricultural working machine, means that the damping characteristics of the piston-cylinder unit are particularly favorable for this load case. If a different load case occurs, particularly one where the crawler drive has to transfer significantly lower forces into the ground, the piston-cylinder unit may act outside of the best possible operating point (e.g., the damping characteristics are not ideal). Via the active pressure device, in such a case, additional hydraulic pressure may be applied to the respective working chamber, particularly the main working chamber, in order to "simulate" a higher load on the crawler drive. In this way, the piston-cylinder unit may be kept within an ideal range of its characteristic curve so that the damping characteristics of the piston-cylinder unit are improved.

In this embodiment, for example, it may be advantageous for the second pressure device to be designed as a passive pressure device and to only comprise a passive gas accumulator.

In one or some embodiments, the crawler drive may be configured so that the axes of rotation of the two main wheels and the pivot axle are at least essentially at a common height level, at least when the crawler drive is in a central position. The pivot axle may be in its zero-position when the crawler drive is in its center position. In one or some embodiments, the center position of the crawler drive describes a state of the crawler drive in which it is standing on level ground (e.g., neither the main wheels nor the support wheels are driving over an obstacle). Such a central position of a crawler drive is illustrated in each of the figures of the example embodiment. The arrangement of the pivot axle at the same height level as the pivot axes of the main wheels may result in no torque being generated around the pivot axle due to belt tension in the running belt. Due to the at least basically identical vertically measured distance of an upper section of the running belt from the swivel axle compared to the vertically measured distance of a lower section of the running belt from the swivel axle, the forces prevailing in the running belt may cancel each other out due to their identical lever arm in relation to the swivel axle, so that no torque occurs. In one or some embodiments, such a torque may only occur when the swivel axle is displaced vertically from its zero-position, which may occur as a result of one of the wheels of the crawler drive being raised.

If there is a deflection of the swivel axle from its zero-position in a vertical direction (e.g., occurring as a result of the lifting of at least one of the wheels of the crawler drive when driving over an obstacle), a torque caused by the running belt and its belt tension will be applied around the swivel axle. This may occur because the distances of the upper section of the running belt and the lower section of the running belt from the swivel axle will generally be different as a result of the vertical displacement of the swivel axle. Accordingly, the lever arm between the lower section of the running belt and the swivel axle and the lever arm between the upper section of the running belt and the swivel axle are different so that the torques generated as a result of the belt tension around the swivel axle do not cancel each other out. Thus, in one or some embodiments, the greater the deflection of the pivot axle in the vertical direction, the greater the effective torque acting on the pivot axle, which may cause a pivoting of the front main frame relative to the rear main frame about the pivot axle. The system may reinforce itself in the process.

Accordingly, in one or some embodiments, the crawler drive may comprise at least one spring element. This may be designed passive, wherein a spring force caused by the spring element is solely determined by its spring constant and a deflection of the spring from a force-free state. A first end of the spring element may be connected to the front main frame, and a second end of the spring element may be connected to the rear main frame. In this way, the spring element may connect the two main frames together so that the spring element is stretched or compressed when the two main frames are pivoted relative to each other about the pivot axle. Correspondingly, a change may result in the deflection of the spring and therefore a spring force exerted by the spring element, which may be transferred to the front main frame and the rear main frame at the ends of the spring element. The spring element may be arranged or positioned in such a way that an effective axle of the spring element along which the spring force acts is located at a distance from the pivot axle. In this way, a torque may be exerted on the two main frames about the pivot axle as a result of the spring force. Since the spring force at the ends of the spring element in principle acts in opposite directions on the front main frame and the rear main frame, the front main frame and the rear main frame may be subjected to opposing torques about the common pivot axle.

In this case, the spring element may be configured in such a way that when the crawler drive is in the center position (and therefore when the pivot axle is in its zero-position), it is either in a passive state in which the spring element develops neither tensile forces nor compressive forces, or in a preloaded state with tensile stress or compressive stress, depending on the arrangement. Since the pivot axle typically cannot move downwards from its zero-position, the pivot axle may be moved vertically upwards from its zero-position. Accordingly, with regard to the effect of the belt tension, only such a state may be considered in which the crawler drive "rises" upwards (e.g., the swivel axle is deflected further upwards as a result of its vertical upward movement due to a torque caused by the belt tension of the running belt). The spring element may serve to counteract this movement and to at least reduce or limit the so-called "rising" of the crawler drive.

If the spring element is arranged or positioned in such a way that the two ends of the spring element move away from each other at least partly during (e.g., in the course of) a described rising movement of the crawler drive, the spring element may be designed as a tension spring that is preloaded with a tensile stress. Conversely, the spring element may also be arranged so that its two ends are located at points on the front main frame and the rear main frame that move towards each other as a result of the rising of the crawler drive. In this case, the spring element may be designed as a compression spring that is preloaded with a compressive stress. In any case, the spring element may act so that it counteracts the pivoting of the front main frame relative to the rear main frame as a result of the crawler drive rising.

In one or some embodiments of the crawler drive, the damping device comprises a second piston-cylinder unit, the first end of which is connected to the front main frame, and the second end of which is connected to the rear main frame. The second piston-cylinder unit may be configured to actively apply a mutual torque to the front main frame and the rear main frame about the common pivot axle. In this way, the second piston-cylinder unit, which may be designed single-acting or double-acting, may be suitable for counteracting the above-described rising of the crawler drive when the pivot axle moves upwards from its zero-position and, as a result, torques may be injected to the main frames by the belt tension of the running belt.

If the damping device comprises a second piston-cylinder unit, it may be particularly advantageous if one pressure device interacts with the first piston-cylinder unit, and the other pressure device interacts with the second piston-cylinder unit. In this way, both piston-cylinder units may be used for passive damping and/or for actively exerting forces on the connected components.

In one or some embodiments, the at least one pressure device interacts with the first piston-cylinder unit, which interacts with the support wheel swing arm and the rear main frame. This pressure device may be designed in the manner of a passive gas accumulator. In particular, the pressure device may be assigned to a working chamber of the first piston-cylinder unit, wherein the piston-cylinder unit may be designed single-acting. In this way, the first piston-cylinder unit is particularly well suited for damping shock loads that act on the support wheels in their transmission to the rear main frame.

Furthermore, in one or some embodiments, the damping device comprises a second pressure device which is associated with the second piston-cylinder unit. In one or some embodiments, associated may comprise any one, any combination, or all of a coupling, a connection, an interlocking, a linkage, an attachment, and/or a neighboring or an adjacent location by abutting, bordering, or touching. The second pressure device may comprise a hydraulic pressure source or may be connected to a hydraulic pressure source, wherein a variable hydraulic pressure may be actively applied to a working chamber of the second piston-cylinder unit via the hydraulic pressure source during intended operation of the crawler drive. In one or some embodiments, the second pressure device may also comprise a passive gas accumulator. Furthermore, it may be advantageous if the second piston-cylinder unit is single-acting.

In combination with such a second pressure device, the second piston-cylinder unit may be particularly suitable for counteracting a possible rising of the crawler drive, which is described above. In particular, via the second pressure device or the pressure source associated therewith, such hydraulic pressure may be exerted on the working chamber of the second piston-cylinder unit. The two main frames to which the second piston-cylinder unit are attached by its ends may be subjected to a mutual torque so that a rising movement of the crawler drive is counteracted. In this way, the main wheels and the support wheels may each be kept in permanent contact with the ground as required in order to reliably dissipate forces acting on the crawler drive into the ground.

In one or some embodiments of the crawler drive, the at least one piston-cylinder unit of the damping device is aligned in such a way that a straight longitudinal axis of the piston-cylinder unit, which connects the swing arm end and the frame end of the piston-cylinder unit to each other, is inclined at most by 15° (e.g., at most by 10° or at most by 5°) relative to a vertical. This may have the advantage that the force distribution between the main wheels and the support wheels may be achieved easily. In particular, no other compensating elements or the like may be required that ensure that a desired amount of force is transmitted to the support wheel swing arm and the support wheels if the piston-cylinder unit were oriented "at an angle".

Furthermore, in one or some embodiments, the pivot axle of the two main frames and the machine axle coincide. In this embodiment, the crawler drive may have a central main joint, which may form the articulation point and to which it may be connected to a respective axle of a working machine while forming the machine axle. The pivot axle, at which the front main frame and the rear main frame are pivotably connected to each other, may also be formed at this central main joint. In one or some embodiments, the articulation point (and thus the machine axle and the pivot axle) is located centrally on the crawler drive viewed in the longitudinal direction of the crawler drive, so that a horizontally measured distance of the axis of rotation of the front main wheel from the pivot axle is at least basically just as large as a horizontally measured distance of the axis of rotation of the rear main wheel from the pivot axle. This embodiment may also contribute to a simplification of the crawler drive, since the kinematics of the possible relative movements of the individual elements to one another is simplified compared to an embodiment in which the pivot axle and machine axle are arranged separately from one another.

In one or some embodiments, the swing arm end and the frame end of the at least one piston-cylinder unit are arranged on the same side of a vertically oriented central plane, which may contain the pivot axle viewed in the longitudinal direction of the crawler drive. This center plane, which may be oriented perpendicular to a running belt plane spanned by the running belt, conceptually separates the crawler drive into a front section and a rear section. The front section may comprise the front main frame and the front main wheel, and the rear section may comprise the rear main frame and the rear main wheel. According to the above description, the pivot axle may be located in correspondence of its position with the machine axle and further may be in a center of the crawler drive viewed in the longitudinal direction.

The arrangement of the at least one piston-cylinder unit on one side of the center plane, such as on the side of the front section, may also contribute to particularly simple kinematics of the crawler drive, the force ratio in which the support wheel swing arm and therefore the support wheels are subjected to forces or used to direct forces into the ground may be set by the distance of the piston-cylinder unit from the pivot axle. The support wheels may cause a greater transfer of force the closer the swing arm end of the piston-cylinder unit is to the support frame viewed along the support wheel swing arm. For example, the swing arm end may be arranged or positioned exactly in the middle of the support wheel swing arm so that forces that are introduced into the support wheel swing arm via the piston-cylinder unit are distributed, such as distributed half to the articulation of the support wheel swing arm to the front main frame and half to the support frame, respectively. A displacement of the swing arm end along the support wheel swing arm may correspondingly result in a distribution of the forces to the front main frame and the support frame that differs from the halved distribution. In one or some embodiments, the swing arm end of the piston-cylinder unit is located in a direction parallel to the longitudinal axis of the crawler drive viewed at a distance from the pivot axle of at most ¼ (e.g., at most ⅙ or at most ⅛) of a correspondingly measured wheel spacing between the axes of rotation of the main wheels.

In one or some embodiments, an agricultural work machine is disclosed. The agricultural work machine comprises a body and at least two crawler drives (e.g., a left crawler drive and a right crawler drive). The crawler drives may each be connected to the body via an articulation point. In particular, the crawler drives may be connected to a front axle of the working machine. The work machine is characterized in that at least one of the crawler drives, such as both crawler drives, is or are formed according to the present application by a crawler drive. The thereby resulting advantages have already been presented above.

Figure 1:
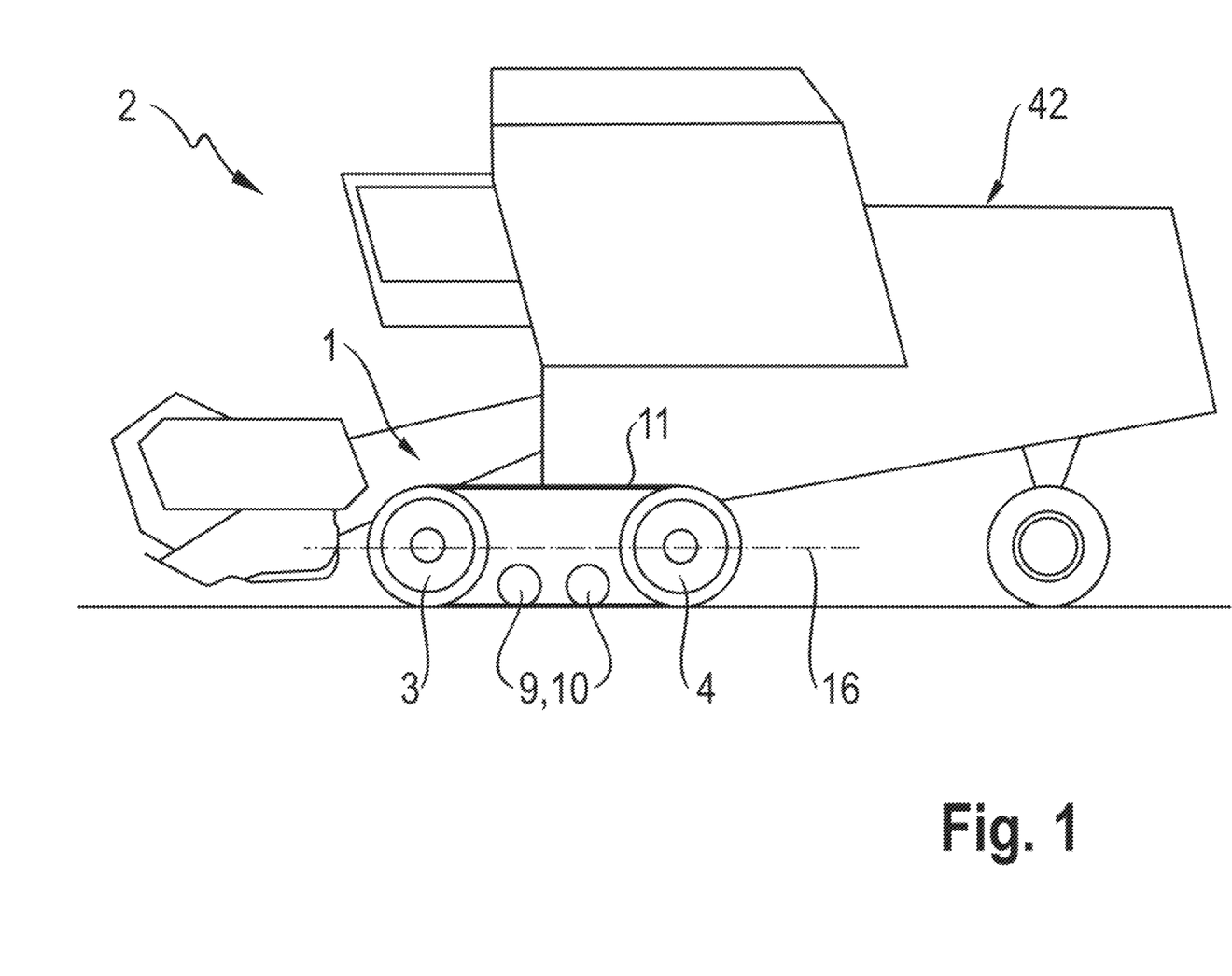
FIG. 1 illustrates a schematic side view of an agricultural work machine equipped with two crawler drives.

Referring to the figures, FIG. 1 shows an agricultural work machine 2 in the form of a self-propelled combine harvester, the body 42 of which interacts with two crawler drives 1. An example combine harvester is disclosed in US Patent Application Publication No. 2024/0081182 A1, incorporated by reference herein in its entirety. The crawler drives 1 may be connected to a front axle of the agricultural working machine 2. In one or some embodiments, the crawler drives 1 have a front main wheel 3, a rear main wheel 4 and two support wheels 9, 10. Furthermore, the crawler drive 1 may comprise a running belt 11 that spans the two main wheels 3, 4. The main wheels 3, 4 may be arranged opposite each other viewed along a longitudinal axis 16 of the crawler drive 1. The support wheels 9, 10 may be arranged in an intermediate area or region between the main wheels 3, 4. Overall, there is a transfer of forces which are conducted from the agricultural working machine 2 to the crawler drive 1 both via the main wheels 3, 4 and via the support wheels 9, 10 into the ground.

Figure 2:
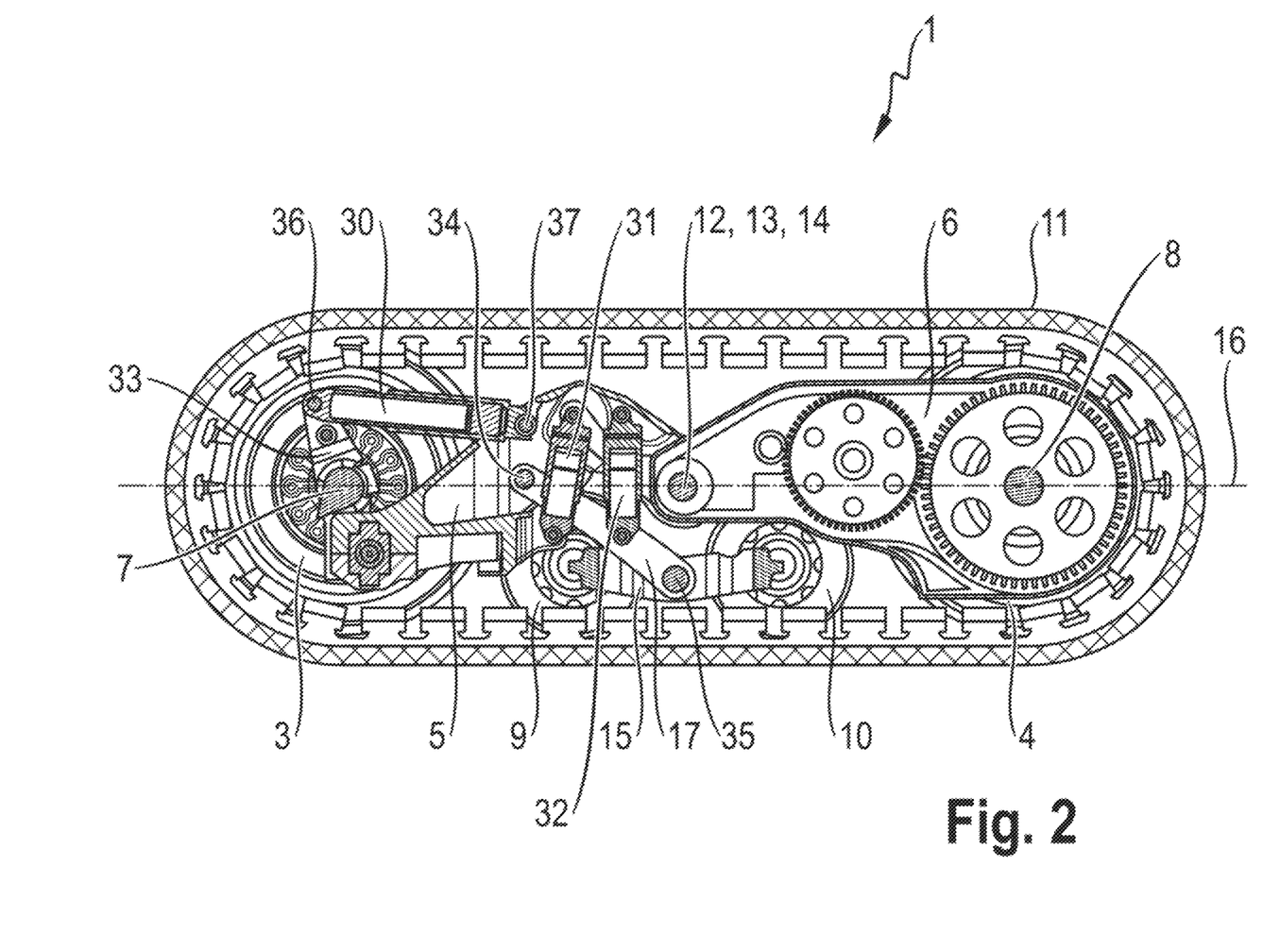
FIG. 2 illustrates a cross-section through a crawler drive.

In one or some embodiments, the construction of a crawler drive 1 is basically the same as other crawler drives. One such example is illustrated in FIG. 2. The crawler drive 1 therein has a front main frame 5 and a rear main frame 6. The front main frame 5 and the rear main frame 6 may be connected to each other at a central articulation point (such as at pivot point 12) of the crawler drive 1 while forming a pivot axle 14 so that the front main frame 5 and the rear main frame 6 may pivot relative to each other. In the depicted example, the pivot axle 14 coincides with a machine axle 13 formed at the pivot point 12, about which the crawler drive 1 as a whole is pivotably mounted about a respective axis of the agricultural working machine 2. The machine axle 13 and the pivot axle 14 may be oriented horizontally and perpendicular to a belt plane which is spanned by the running belt 11. In FIG. 2, the belt plane is formed by the drawing plane or parallel thereto. Furthermore, the pivot axle 14 is arranged centrally in relation to the length of the crawler drive 1 measured along the longitudinal axis 16 of the crawler drive 1 so that a central plane 29 (such as a vertical central plane), which may also be oriented perpendicular to the belt plane of the running belt 11 and may contain the pivot axle 14, divides the crawler drive 1 into two sections of at least substantially equal size (e.g., into a front section and a rear section). The front section may contain the front main frame 5 and the front main wheel 3, while the rear section may comprise the rear main frame 6 and the rear main wheel 4. Furthermore, when the crawler drive 1 is in a central position as illustrated in FIG. 2, the pivot axle 14 may be arranged or positioned centrally, as viewed in the vertical direction (e.g., in relation to the height of the crawler drive 1), so that a vertically measured distance of the pivot axle 14 from a lower section 39 of the running belt 11 is just as large as a vertically measured distance of the pivot axle 14 from an upper section 38 of the running belt 11. As a result of this, forces prevailing in the running belt 11 as a result of belt tension in the running belt 11 may not cause any torque around the pivot axle 14, provided the pivot axle 14 is in its zero-position shown in FIG. 2, which the pivot axle 14 assumes when the crawler drive 1 is in its center position.

In one or some embodiments, a support wheel swing arm 17 is hinged to the front main frame 5 while forming a joint 34. At an end of the support wheel swing arm 17 opposite the joint 34, the front main frame 5 is connected to a support frame 15, also while forming a joint 35. The two support wheels 9, 10 may each be rotatably mounted on this support frame 15.

In the depicted example, the front main wheel 3 is only indirectly mounted on the front main frame 5. This is done so that the front main wheel 3 is mounted on a swivel arm 33, which in turn is articulated on the front main frame 5. In this way, a distance from the axis of rotation 7 of the front main wheel 3 to the pivot axle 14 may be changed by swiveling the swivel arm 33 relative to the front main frame 5. This may be used to adjust or readjust the belt tension of the running belt 11. To achieve this, the depicted crawler drive 1 comprises a belt tensioning cylinder 30 formed by a piston-cylinder unit, which may be mounted with its first end 36 on the swivel arm 33 and with its second end 37 on the front main frame 5. By changing the deflection of the belt tensioning cylinder 30, the swivel arm 33 may be pivoted relative to the front main frame 5, whereby the axis of rotation 7 may be displaced horizontally in the manner described, and its horizontally measured distance from the axis of rotation 8 of the rear main wheel 4 may thereby be changed. Accordingly, the belt tension of the running belt 11 may be changed by means of such a movement.

The depicted crawler drive 1 may also comprise two further piston-cylinder units 31, 32, wherein the first of which couples the front main frame 5 to the rear main frame 6 and the second of which couples the support wheel swing arm 17 to the front main frame 5. In interaction, the piston-cylinder units 31, 32 may be configured to distribute the forces acting on the crawler drive 1 to the main wheels 3, 4 and the support wheels 9, 10. In particular, the object may generally be to transfer the forces more evenly (e.g., as evenly as possible) via the main wheels 3, 4 and the support wheels 9, 10 into the ground. For this purpose, pressure chambers of the two piston-cylinder units 31, 32 may be fluidically coupled with each other so that the displacement of a hydraulic fluid from a pressure chamber of one piston-cylinder unit 31, 32 results in a corresponding inflow of the fluid into a pressure chamber of the other piston-cylinder unit 31, 32. In this way, the components of the front main frame 5, rear main frame 6, and support wheel swing arm 17 or support frame 15 may be kinematically coupled to one another in order to achieve the aforementioned force distribution and, in particular, to keep the wheels 3, 4, 9, 10 in continuous contact with the ground. In particular, this continuous contact with the ground may be maintained even if one or more of the wheels 3, 4, 9, 10 are raised differently when driving over an obstacle.

Figure 3:
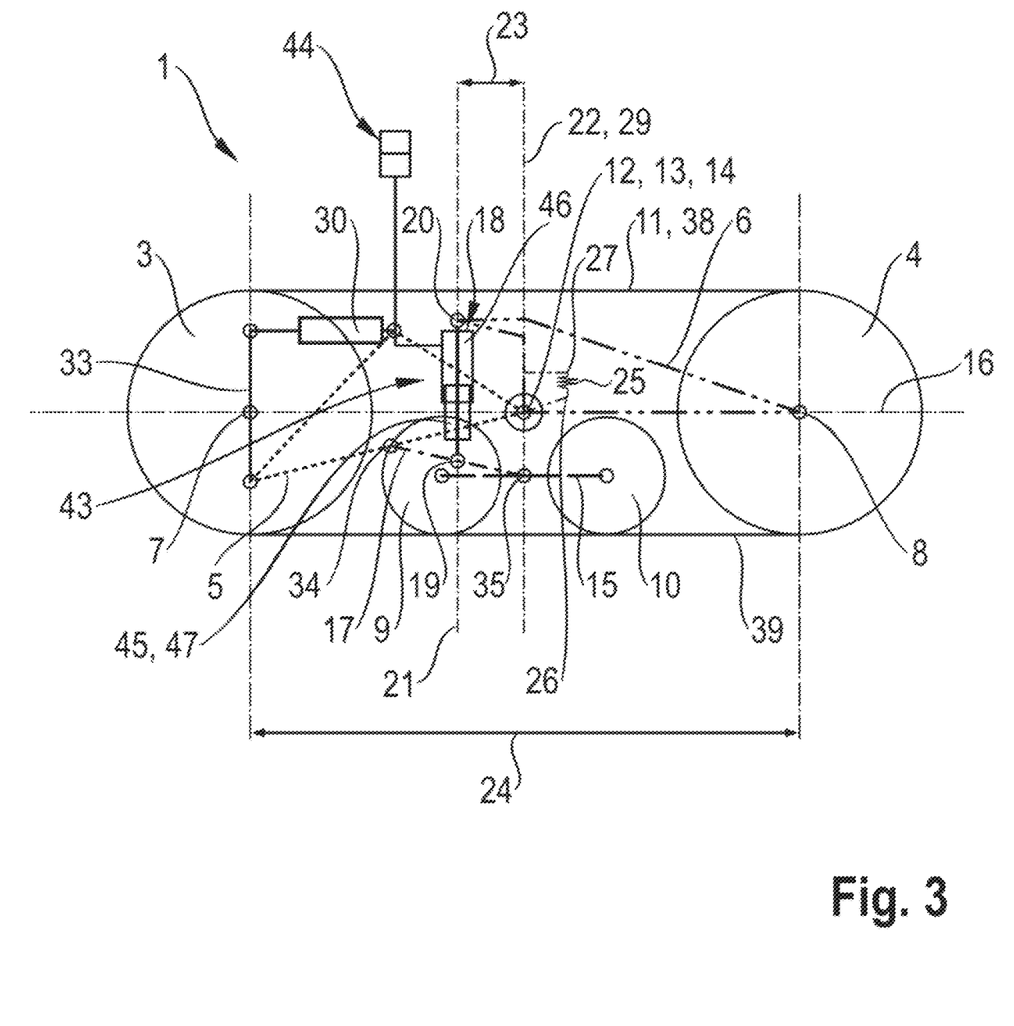
FIG. 3 illustrates a schematic diagram of a first crawler drive according to one aspect of the invention.

A first embodiment of a crawler drive 1 is illustrated in FIG. 3. It differs from the known crawler drive 1 in that it comprises a damping device 43, which may comprise any one, any combination, or all of a piston-cylinder unit 18, a first pressure device 44 (e.g., a first hydraulically acting pressure device), and a second pressure device 45 (e.g., a second hydraulically acting pressure device).

The piston-cylinder unit 18 may couple the support wheel swing arm 17 to the rear main frame 6. Accordingly, one swing arm end 19 of the piston-cylinder unit 18 may be articulated to the support wheel swing arm 17, while one frame end 20 of the piston-cylinder unit 18 may be articulated to the rear main frame 6. In this way, the piston-cylinder unit 18 may act mechanically as a pendulum rod, which may only transmit normal forces, but may not enable the transmission of transverse forces and torques between the support wheel swing arm 17 and the rear main frame 6. As a result of the piston-cylinder unit 18, the front main frame 5, the support wheel swing arm 17 and the rear main frame 6 may be kinematically coupled to each other. In this way, the piston-cylinder unit 18 alone may ensure that when one of the wheels 3, 4, 9, 10 is lifted, the remaining wheels 3, 4, 9, 10 may remain in contact with the ground, and force accordingly may continue to be transferred to the ground via these wheels 3, 4, 9, 10. This has already been explained using two examples in the above description.

In contrast to the crawler drive 1 according to the FIG. 2, it may therefore not be necessary to install two separate piston-cylinder units 31, 32 in order to kinematically couple the support wheel swing arm 17 as well as the front main frame 5 and the rear main frame 6 to one another. Accordingly, the crawler drive 1 may be significantly simplified, without restricting the functionality of the crawler drive 1. In a particularly advantageous manner, the crawler drive 1 according to FIG. 3 may be free of other coupling members or piston-cylinder units (e.g., couple the support wheel swing arm 17 to the front main frame 5, or the front main frame and the rear main frame 6 to each other). Compared to the crawler drive 1 according to FIG. 2, the crawler drive 1 depicted in FIG. 3 may have a particularly simpler design without being disadvantageous in terms of its functionality.

In the depicted example, the piston-cylinder unit 18 is oriented at least substantially vertically so that a member axis 21 connecting the swing arm end 19 and the frame end 20 is oriented at least substantially parallel to a vertical line 22. This may be seen particularly well from FIG. 3. Furthermore, the piston-cylinder unit 18 may be located completely on one side of the pivot axle 14, wherein in the depicted example, the piston-cylinder unit 18 is located in the front section of the crawler drive 1 on this side of the central plane 29. Furthermore, the piston-cylinder unit 18 may be arranged or positioned so that it is located at a horizontally measured distance 23 from the pivot axle 14, which may correspond to approximately one eighth of a wheel distance 24, also measured horizontally, between the axes of rotation 7, 8 of the two main wheels 3, 4. In this arrangement, at least when the crawler drive 1 is in its center position as shown in FIG. 3, one quarter of any force transmitted to the crawler drive 1 at the pivot point 12 (e.g., the central articulation point) may be transmitted to the ground via each of the two main wheels 3, 4 and the two support wheels 9, 10. Furthermore, in the depicted example, the swing arm end 19 of the piston-cylinder unit 18 may be arranged or positioned approximately centrally on the support wheel swing arm 17 so that a horizontally measured distance of the swing arm end 19 from the two joints 34, 35 is the same. This may cause approximately half of the vertical force transmitted via the piston-cylinder unit 18 to the support wheel swing arm 17 to be transferred to the front main frame 5 and half to the support frame 15.

In the shown example, the piston-cylinder unit 18 is designed double-acting and accordingly may comprise a main working chamber 46 on the cylinder side and a secondary working chamber 47 on the piston side. Furthermore, the damping device 43 may be designed such that the first pressure device 44 is assigned to the main working chamber 46, and the second pressure device 45 is assigned to the secondary working chamber 47. The first pressure device 44 and the second pressure device 45 may each be formed here by passive gas accumulators, which may have a compressible gas volume. The gas volumes may be separated via diaphragms from a respective hydraulic fluid, which may be located in the main working chamber 46 and the secondary working chamber 47 of the piston-cylinder unit 18, and may be exchanged with the first and second pressure devices 44, 45 via lines. In the depicted example, the second pressure device 45 is integrated into the piston-cylinder unit 18, wherein a gas volume of the second pressure device 45 is arranged directly in the secondary working chamber 47. In contrast, the first pressure device 44 may be fluidically connected to the main working chamber 46 via a line shown schematically in FIG. 3. The first and second pressure devices 44, 45 may enable a damping function that the piston-cylinder unit 18 fulfills. In this way, shock-like loads that act on the wheels 3, 4, 9, 10 (e.g., as a result of driving over an obstacle) may be dampened in order to avoid shock-like loads.

In the depicted example, the front mainframe 5 and the rear mainframe 6 are also directly coupled to each other by means of a spring element 25. The spring element 25 may be connected at a first end 26 to the front main frame 5 and at a second end 27 to the rear main frame 6 so that spring forces caused by the spring element 25 may act directly on the front main frame 5 and the rear main frame 6 in opposite directions. In the depicted example, the spring element 25 is designed passive so that forces caused by the spring element 25 are solely due to a deflection (e.g., stretching or compression) of the spring element 25. It is contemplated for the spring element 25 to be pretensioned (e.g., with a compressive force) so that opposing forces and corresponding torques act on the front main frame and the rear main frame 6, even when the crawler drive 1 is in its central position.

Figure 5:
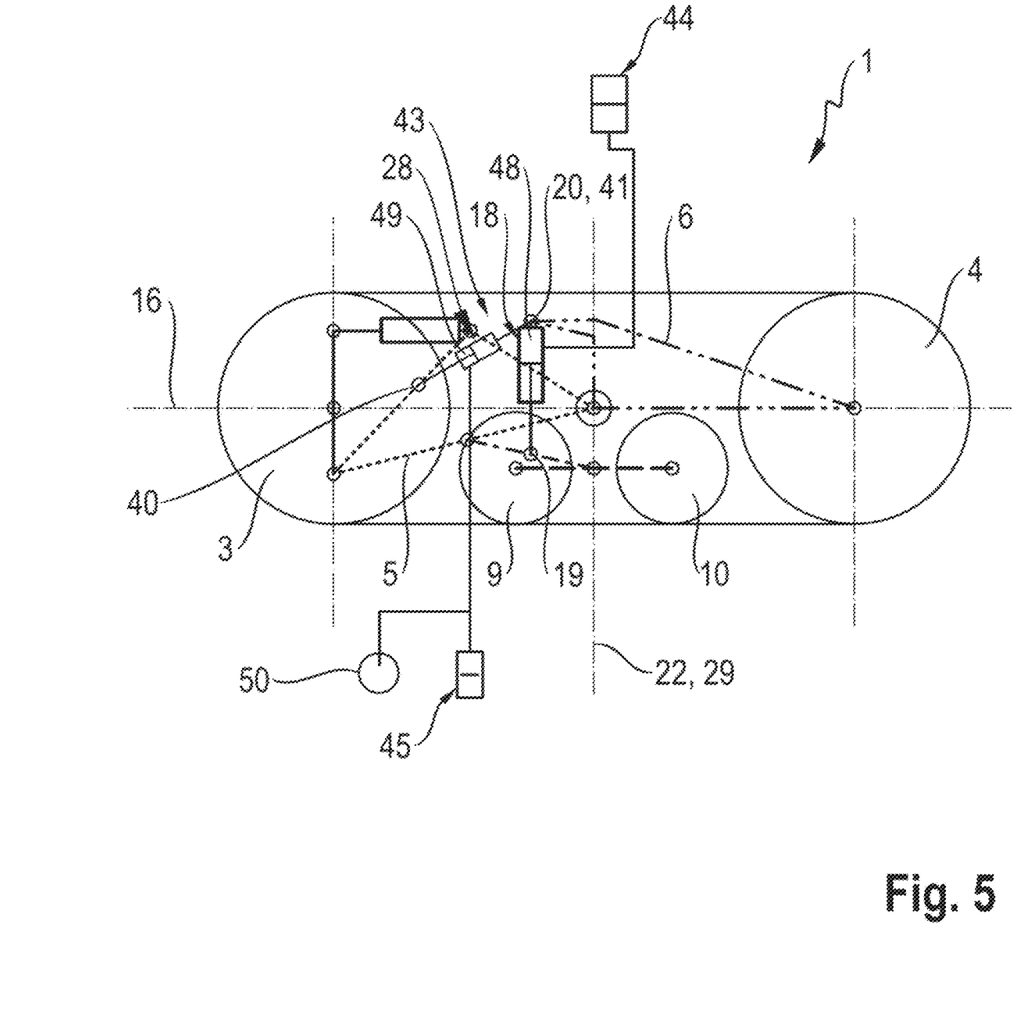
FIG. 5 illustrates a schematic diagram of a third crawler drive according to one aspect of the invention.

In one or some embodiments, the function of the spring element 25 is to reduce and thereby control the above-described rising of the crawler drive 1 as a result of a vertical upward displacement of the pivot axle 14 starting from its zero-position shown in FIG. 5. Said rising may be caused by the fact that a vertically measured distance of the pivot axle 14 from an upper section 38 of the running belt 11 is reduced due to a vertical upward displacement of the pivot axle 14, while a similarly measured distance of the pivot axle 14 from a lower section 39 of the running belt 11 is increased. This may cause a torque around the pivot axle 14 on the front main frame 5 and the rear main frame 6 due to belt tension of the running belt 11, which favors further upward movement of the pivot axle 14. The further the pivot axle 14 is raised, the greater the torque that supports this effect, so that a self-reinforcing upward deflection of the pivot axle 14 results.

The spring element 25 may serve to counteract a decrease in a distance between the first end 26 and the second end 27 of the spring element 25 caused by such a movement of the front main frame and the rear main frame 6. In the shown example, this may be done so that the spring element 25 is compressed, and a counterpressure force builds up corresponding to its spring constant. This may counteract further movement of the first end 26 and the second end 27 of the spring element 25, wherein a torque may be applied to the front main frame and the rear main frame 6, which may counteract the rising of the crawler drive 1.

Figure 4:
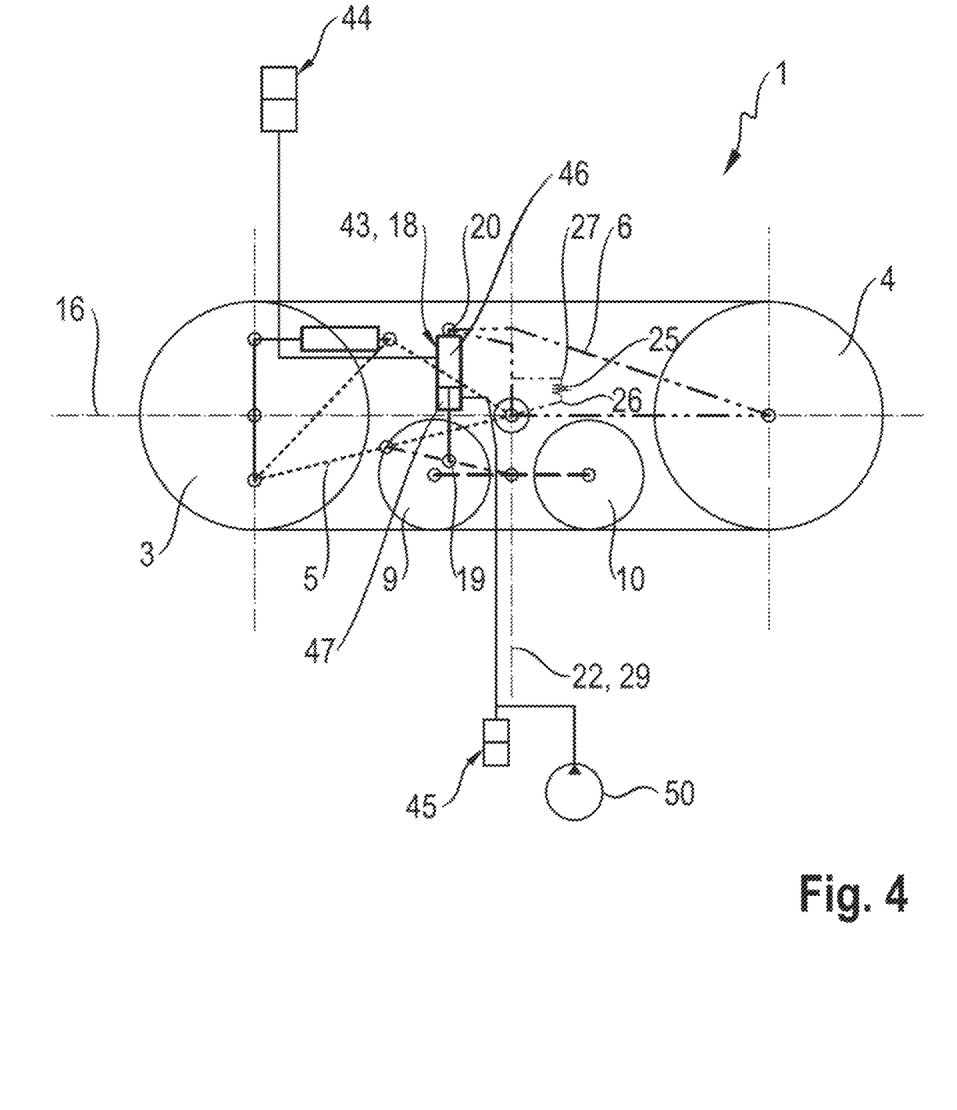
FIG. 4 illustrates a schematic diagram of a second crawler drive according to one aspect of the invention.

In another embodiment of a crawler drive 1 shown in FIG. 4, the damping device 43 may also be equipped with a piston-cylinder unit 18 and first and second pressure devices 44, 45. In contrast to the depicted example in FIG. 3, the second pressure device 45, which may be assigned to the secondary working chamber 47 of the piston-cylinder unit 18, may not be integrated in the piston-cylinder unit 18. Furthermore, in the depicted example, the second pressure device 45 is connected to a pressure source 50. In this way, the second pressure device 45 may act as an active pressure device. The pressure source 50 may be connected via a line so that a hydraulic pressure provided via the pressure source 50 may act on the secondary working chamber 47 of the piston-cylinder unit 18. Consequently, the pressure source 50 may be suitable for extending a piston of the piston-cylinder unit 18 and may thereby increase a volume of the secondary working chamber 47, while a volume of the main working chamber 46 may be reduced.

This may allow the pressure in the main working chamber 46 to be artificially maintained within a predetermined range. This may be advantageous, for example, if a force acting on the crawler drive 1 is so small that the pressure in the main working chamber 46 is outside an advantageous range. In particular, the piston-cylinder unit 18 may be kept in an advantageous range of its characteristic curve in order to make the best possible use of the damping properties of the piston-cylinder unit 18. By applying a pressure to the secondary working chamber 47, the pressure in the main working chamber 46 may be controlled so that it may always be within a predefined, advantageous range. The damping characteristic of the piston-cylinder unit 18 may thus be kept within a favorable range of its characteristic curve regardless of the load on the crawler drive 1.

In another embodiment shown in FIG. 5, the damping device 43 has a second piston-cylinder unit 28 with at least two ends (e.g., a first end 40 and a second end 41). The first end 40 may interact with the front main frame 5, and the second end 41 may interact with the rear main frame 6. The second piston-cylinder unit 28 may be connected to a hydraulic pressure source 50, whereby hydraulic pressure may be applied to a working chamber 49 of the second piston-cylinder unit 28 via the pressure source 50. Since the working chamber 49 may be arranged or positioned on the piston side, a piston of the second piston-cylinder unit 28 may be retracted into an associated cylinder due to the application of hydraulic pressure to the working chamber 49. This may lead to a shortening of the second piston-cylinder unit 28 and therefore to a movement of the first and second ends 40, 41 of the second piston-cylinder unit 28 towards each other. For example, when the crawler drive 1 is in a central position as shown in FIG. 5, such a movement may mean the same thing as the two main wheels 3, 4 being raised and thereby relieved, while the two support wheels 9, 10 may contribute a greater share to the removal of the forces acting on the crawler drive 1. In this way, it is contemplated to specifically reduce the forces transferred to the ground via the two main wheels 3, 4, which may be advantageous, for example, during a turning maneuver of the agricultural work machine 2 in the area of a headland or during road travel of the respective agricultural work machine 2.

Furthermore, the second piston-cylinder unit 28 may be used to actively counteract the above-described raising of the crawler drive 1 by applying pressure to the working chamber 49. An additional spring element 25, as shown in the other example embodiments, may therefore be omitted here.

In the depicted example, the first pressure device 44, which may be formed by a passive gas accumulator and therefore may represent a passive pressure device, may be assigned to a working chamber 48 of the first piston-cylinder unit 18 which may be designed here to be single-acting. The second pressure device 45 may be assigned to the working chamber 49 of the second piston-cylinder unit 28 and may be connected to the described pressure source 50. Consequently, the second pressure device 45 may form an active pressure device, even if it also comprises a passive gas accumulator.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Crawler drive
2 Work machine
3 Front main wheel
4 Rear main wheel
5 Front main frame
6 Rear main frame
7 Axis of rotation
8 Axis of rotation
9 Support wheel
10 Support wheel
11 Running belt
12 Articulation point
13 Machine axle
14 Pivot axle
15 Support frame
16 Longitudinal axis
17 Support wheel swing arm
18 Piston/cylinder unit
19 Swing arm end
20 Frame end
21 Member axle
22 Vertical
23 Distance
24 Wheel distance
25 Spring element
26 End
27 End
28 Piston/cylinder unit
29 Center plane
30 Belt tensioning cylinder
31 Piston/cylinder unit
32 Piston/cylinder unit
33 Swing arm
34 Joint
35 Joint
36 End
37 End
38 Section
39 Section
40 End
41 End
42 Body
43 Damping device
44 First pressure device
45 Second pressure device
46 Main working chamber
47 Secondary working chamber
48 Work zone
49 Work zone
50 Pressure source

The invention claimed is:

1. A crawler drive for an agricultural working machine comprising:
a front main wheel;
a rear main wheel opposite the front main wheel viewed in a longitudinal direction of the crawler drive;
a front main frame associated with the front main wheel;
a rear main frame associated with the rear main wheel;
at least two support wheels arranged in an intermediate region between the main wheels;
a running belt spanning the main wheels;
an articulation point by means of which the crawler drive is pivotably connected to a body of the work machine while forming a machine axle; and a damping device comprising at least one piston-cylinder unit and at least a first hydraulically-acting pressure device and a second hydraulically-acting pressure device which interact with the at least one piston-cylinder unit;

wherein the two main frames are pivotably coupled to one another about a common pivot axle;

wherein the support wheels are arranged one behind the other on a common support frame relative to a longitudinal axis of the crawler drive;

wherein the support frame is pivotably connected to the front main frame by means of a support wheel swing arm;

wherein the at least one piston-cylinder unit is coupled to the support wheel swing arm at a swing arm end and to the rear main frame at a frame end, and thereby couples the support wheel swing arm and the rear main frame to one another;

wherein the at least one piston-cylinder unit is double-acting;

wherein the first hydraulically-acting pressure device is operatively connected to a main working chamber on a cylinder side of the at least one piston-cylinder unit; and wherein the second hydraulically-acting pressure device is operatively connected to a secondary working chamber on a piston side of the at least one piston-cylinder unit.

2. The crawler drive of claim 1, wherein the damping device has exactly the first hydraulically-acting pressure device and the second hydraulically-acting pressure device that interact with the at least one piston-cylinder unit.

3. The crawler drive of claim 1, wherein the first hydraulically-acting pressure device and the second hydraulically-acting pressure device are passive gas accumulators.

4. The crawler drive of claim 3, wherein the first hydraulically-acting pressure device and the second hydraulically-acting pressure device are preloaded with different pressures.

5. The crawler drive of claim 4, wherein the first hydraulically-acting pressure device is preloaded with a greater pressure than the second hydraulically-acting pressure device.

6. The crawler drive of claim 1, wherein at least one of the first hydraulically-acting pressure device or the second hydraulically-acting pressure device is integrated in the at least one piston-cylinder unit.

7. The crawler drive of claim 1, wherein at least one of the first hydraulically-acting pressure device or the second hydraulically-acting pressure device comprises a gas accumulator.

8. The crawler drive of claim 7, wherein at least one of the first hydraulically-acting pressure device or the second hydraulically-acting pressure device comprises a hydraulic pressure source or is connected to a hydraulic pressure source, by which a variable hydraulic pressure is applied to one or both of a main working chamber or a secondary working chamber of the at least one piston-cylinder unit.

9. The crawler drive of claim 1, wherein both of the first hydraulically-acting pressure device and the second hydraulically-acting pressure device comprise a gas accumulator.

10. The crawler drive of claim 1, further comprising a spring element whose first end is connected to the front main frame and whose second end is connected to the rear main frame; and wherein the spring element is configured to apply mutual torque about the common pivot axis to the front main frame and the rear main frame at least when the pivot axle is located above a zero position which a respective main wheel assumes when the crawler drive is in a center position in which the crawler drive stands on level ground.

11. The crawler drive of claim 1, wherein the damping device further comprises a second piston-cylinder unit, a first end of the second piston-cylinder unit is connected to the front main frame, and a second end of the second piston-cylinder unit is connected to the rear main frame; and wherein the second piston-cylinder unit is configured to actively apply a mutual torque about the common pivot axis to the front main frame and the rear main frame.

12. The crawler drive of claim 1, wherein the pivot axle of the front main frame and the rear main frame coincides with the machine axle.

13. The crawler drive of claim 1, wherein axes of rotation of the front main wheel, the rear main wheel and the pivot axle lie at least on a common height level when the crawler drive is in a central position in which the crawler drive is standing on level ground.

14. The crawler drive claim 1, wherein the at least one piston-cylinder unit comprises a first piston-cylinder unit; and wherein the first hydraulically-acting pressure device is assigned to the first piston-cylinder unit, and the second hydraulically-acting pressure device is assigned to a second piston-cylinder unit.

15. The crawler drive of claim 14, wherein the first hydraulically-acting pressure device comprises a passive gas accumulator; and wherein the first hydraulically-acting pressure device is assigned to a working chamber of the first piston-cylinder unit.

16. The crawler drive of claim 14, wherein the second hydraulically-acting pressure device comprises a hydraulic pressure source or is connected to a hydraulic pressure source; and wherein via the hydraulic pressure source, a variable hydraulic pressure is actively applied to a working chamber of the second piston-cylinder unit.

17. An agricultural work machine comprising:
a body;
a left crawler drive;
a right crawler drive;
wherein the left crawler drive and the right crawler drive are each connected to the body via an articulation point; and
wherein at least one of the left crawler drive or the right crawler drive comprises:
a front main wheel;
a rear main wheel opposite the front main wheel viewed in a longitudinal direction of the crawler drive;
a front main frame associated with the front main wheel;
a rear main frame associated with the rear main wheel;
at least two support wheels arranged in an intermediate region between the main wheels;
a running belt spanning the main wheels;
the articulation point by means of which the crawler drive is pivotably connected to the body of the work machine while forming a machine axle; and
a damping device comprising at least one piston-cylinder unit and at least a first hydraulically-acting pressure device and a second hydraulically-acting pressure device which interact with the at least one piston-cylinder unit;
wherein the two main frames are pivotably coupled to one another about a common pivot axle;

wherein the support wheels are arranged one behind the other on a common support frame relative to a longitudinal axis of the crawler drive;

wherein the support frame is pivotably connected to the front main frame by means of a support wheel swing arm;

wherein the at least one piston-cylinder unit is coupled to the support wheel swing arm at a swing arm end and to the rear main frame at a frame end, and thereby couples the support wheel swing arm and the rear main frame to one another;

wherein the at least one piston-cylinder unit is double-acting;

wherein the first hydraulically-acting pressure device is operatively connected to a main working chamber on a cylinder side of the at least one piston-cylinder unit; and wherein the second hydraulically-acting pressure device is operatively connected to a secondary working chamber on a piston side of the at least one piston-cylinder unit.

* * * * *